Sept. 24, 1963   J. B. McKINNEY   3,104,695
TOOL FOR APPLYING AND REMOVING PNEUMATIC TIRES
Filed Sept. 12, 1961

J. B. McKINNEY
INVENTOR,
By: Homer R. Montague
ATTY.

United States Patent Office 3,104,695
Patented Sept. 24, 1963

3,104,695
TOOL FOR APPLYING AND REMOVING
PNEUMATIC TIRES
Jennings B. McKinney, Havelock, N.C.; Marjorie K.
McKinney, executrix of said Jennings B. McKinney,
deceased
Filed Sept. 12, 1961, Ser. No. 137,692
3 Claims. (Cl. 157—1.22)

This invention pertains to tire tools, and particularly to an improved tool for use by tire service men in applying and removing pneumatic tires in connection with the rims or wheels of vehicles. An important object of the invention is to provide a tool of this kind which will permit these operations without any possibility of damage to the tire structure and which will greatly reduce the difficulty of performing the necessary operations while achieving that result.

The tool of the invention is adapted for use either with tires containing a separate inner tube, or with the increasingly common tubeless tires that are characterized by the existence of a pneumatic seal between the wheel rim flanges and the beads of the tire itself. The integrity and reliability of the latter type of tire depends very strongly upon the perfection of the sealing edges of the tire beads. Presently known service station tools for changing tires were developed mostly for use with tube-type tires in which the ability to retain the compressed air did not depend upon a pneumatic seal between the tire bead and the wheel rim. When used with tubeless tires, such tools are prone to injure the sealing surfaces of the beads; not only because they apply heavy forces directly to this portion of the tire, but also because the close dimensional fit requires that such tools be used with great force, increasing the labor required and encouraging the possibility of cutting, scoring, bruising, and the like.

Notwithstanding the above remarks, it will be understood that the improved tool has also great advantages with respect to ease of use and prevention of tire damage, when the same is employed in connection with tires of the type that do contain an inflatable inner tube.

My invention provides a double-ended tire tool having, at one end, an improved arrangement of parts for the safe and easy displacement of a tire bead from behind the flange of a wheel or rim on which the tire is mounted. At its other end, the tool provides a vastly improved arrangement of parts for the safe and easy placement of a tire bead into its seated position behind such a rim; and without any possibility of damaging contact between the tool and the sensitive sealing surface of the tire bead in the case of tubeless tires. This latter facility is accomplished by an arrangement of special rollers of which one engages and is guided upon the concave annular surface of the wheel or rim, and of which the other is specially shaped to engage a part of the tire spaced away from the bead, so as to exert rolling pressure in the proper direction without any possibility of bead damage.

The objects of the invention can be accomplished by arrangements which vary in detail from one another, all properly falling within the basic principles which I have found to be essential. In accordance with the patent laws, I will disclose below a preferred specific construction of my tool so that those skilled in this art can use the invention in this form as well as in its various modified embodiments. The description which follows will refer specifically to the appended drawings, in which.

Figure 1:
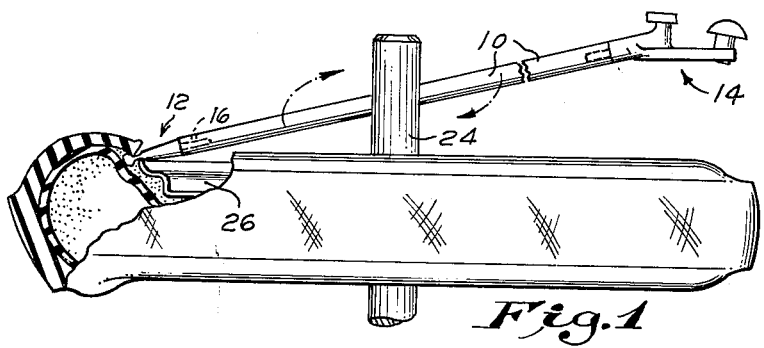
FIG. 1 is a view in side elevation of the preferred form of tool, shown in the operation of removing one bead of a tire from a wheel mounted in the known way upon the workstand usually referred to, in service station parlance, as a "tire machine."

FIGURE 1 of the drawings shows the entire tool of my invention, there being a rod or pipe handle portion 10 about three freet in length and of either solid or tubular construction. Each end of the handle portion is constructed to receive one of the operating instrumentalities mentioned above, these being indicated as the removing part or fitting 12 and the applying part or fitting 14. While other connections may be employed, I prefer to provide a socket portion at each end of the handle 10, to receive a corresponding shaft portion of the corresponding fitting. In the case of the removing fitting 12, the fitting as a whole is thus received and retained for free rotation about the lengthwise axis of the handle, being for example held against casual removal by a pin 16, or a snap ring or the like passing through the handle portion and engaging an annular groove formed in the shaft of the fitting 12.

Fitting 12 thus consists of a freely rotatable conical region 18 which merges into an annular round-walled but flat-bottomed groove 20 which separates the conical portion from a terminal ball-like end 22. As indicated in FIGURE 1, the tool is generally employed, both for applying and for removing tires to rims or wheels, in connection with a so-called "tire machine" including a vertical shaft 24 having means to receive and clamp the wheel 26 thereon in a horizontal position as shown, the shaft or post extending above the wheel to provide a pivot or fulcrum post about which the tire tool is rotated by manual force after the operative end thereof has been properly applied to the tire casing. It will be understood that such tire machines, as well known in this art, often include manual or power means for initially breaking the tire casing bead loose from the rim after the tire has been deflated and the wheel is mounted upon the machine. Since these details are well understood, they have not been illustrated in the drawings.

Figure 2:
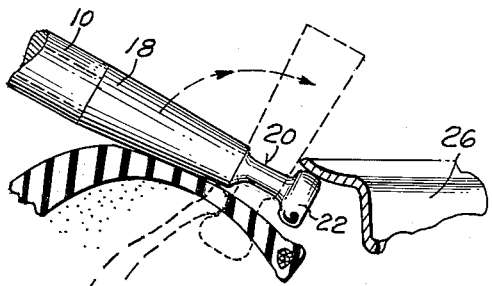
FIG. 2 is an enlarged view of the "removing" end of the tool, shown in a preliminary position in the operation of removing a tire.

In the operation of removing a deflated casing from a wheel, the ball end 22 of fitting 12 is first thrust between the casing bead and the wheel rim, the tool being held at the angle indicated in full lines in FIGURE 2, and the entire tool is then bodily rotated clockwise about a horizontal axis as indicated by the arrow, until the tool handle is approximately in the dash line position in that figure. During this rotation, and especially if the tire contains an inner tube, the ball end effectively prevents any damage to the casing bead and inner tube. The rotational fulcrum of the tool as a whole during this motion is provided by the wheel rim's edge, upon which the conical portion 18 is free to rotate. During this action the annular groove 20 slides along the casing bead without damage to the tire or tube.

Figure 3:
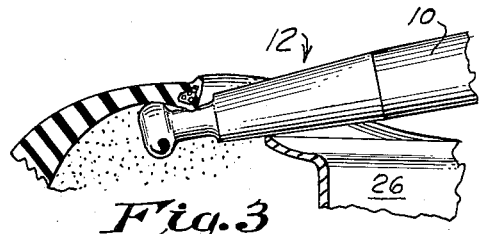
FIG. 3 is a similar view with this part of the tool shown in a later position of operation.

The levering action of the tool has now necessarily lifted a segment of the casing bead above the edge of the wheel rim, as indicated in FIGURE 3, and the handle portion 10 will lie behind the center post 24 of the tire machine. The operator now proceeds to the pull the free end of the tool horizontally about post 24, thus causing the fitting 12 to move progressively about the rim of the wheel, lifting or "ploughing" the remainder of the casing bead above such rim and freeing the tire, which can now be lifted (if desired or necessary) because the casing as a whole can be tilted sufficiently to allow its opposite (lower) bead ring to pass over the rim of the wheel without difficulty.

Figure 4:
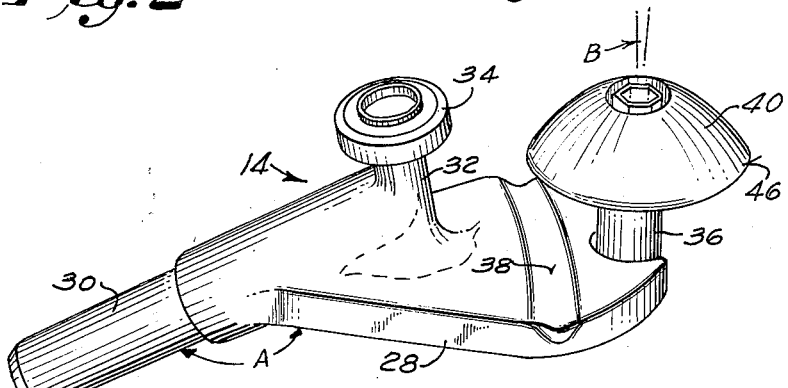
FIG. 4 is a perspective view of the "tire-applying" part of the tool.

When it is desired to install a tire upon a wheel, the wheel is mounted upon the tire machine in the same manner as before, and the tire is dropped over the upper wheel rim, the lower or underneath tire bead being passed freely over this upper rim by giving a slight tilting motion to the tire. During this operation, the opposite end fitting 14 will be employed, and the arrangement thereof will now be detailed in connection with FIGURES 4 and 5 of the drawings. FIGURE 4 shows this fitting in perspective, and upside-down from its normal use position, for clearer understanding thereof.

As shown in FIGS. 1 and 4, fitting 14 is also preferably connected to handle 10 by a socket arrangement, but it is not necessary that this fitting be rotatable about the handle axis. The fitting comprises a strong and rigid plate-like body portion 28 from one side edge of which the handle connection 30 extends, preferably at an angle A of approximately 15 degrees relative to the main plane of body 28. From the opposite (upper) surface of portion 28 extends a perpendicular pivot post or stub shaft 32 having a height of about one and a half inches, and terminating in a freely rotatable wheel 34, suitably retained on the end of the post by conventional means. The post 32 may be webbed to body 28 for increased strength, if desired. This wheel 34 lies adjacent the end of body portion 28 that is connected to handle 10. At the far end of body portion 28, and in fact overhanging its end edge, there is mounted a second stub shaft or post 36, whose axis extends at an angle B of about 7 to 10 degrees to a line normal to the general plane of the upper (in this figure) face of body portion 28. In end view (not shown), posts 32 and 36, and the axis of connection 30 and handle 10, preferably lie in the same plane.

Formed in this "upper" surface of body portion 28 is a shallow arcuate groove or trough 38 having a radius approximately equal to the wheel rim radius of wheels in the general range of sizes for which the tool is to be used. A different tool is not required for each tire size, because the groove 38 is wide enough to accommodate, or slide along, a variety of rims, the major differences in wheel radius being taken care of by the positioning of the tool as a whole relative to the center post of the tire machine. Groove 38 is shallow, and is rounded off at both its side and end edges, to avoid damaging the wheel rim and to minimize sliding friction.

Mounted for free rotation at the outer extremity of post 36 is a mushroom roller 40 which may be a segment of a sphere, preferably somewhat less than half of a complete sphere. The heights of posts 36 and 32 are so related that the central plane through wheel 34 in FIGURE 4 would pass through a part of the spherical surface of roller 40. Roller 40 is mounted for rotation on or with post 36 by a recessed-head bolt, as shown.

Figure 5:
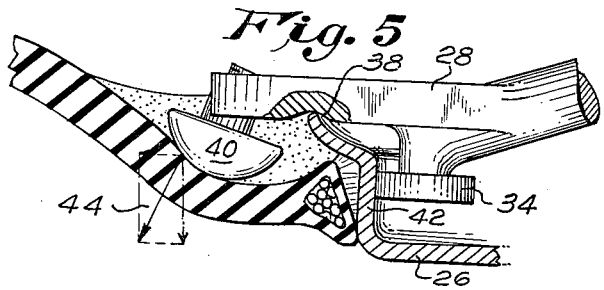
FIG. 5 is a side elevation, partly in section, showing this "applying" portion of the tool in use at an intermediate stage of its operation.

The manner of using this "applying" portion 14 of the tool will be clear from FIGURE 5, which shows the device midway in its operation. As shown, the tool is applied over the wheel rim and flange, with the roller 34 resting upon the said flange which is designated by numeral 42. Groove or trough 38 will now surmount the wheel rim edge as shown, and by raising the free or outer end of the tool handle 10, mushroom roller 40 will be brought into pressure contact with that part of the tire casing whose bead is initially placed beneath the wheel rim, thus holding that portion firmly in the position shown. The handle of the tool is now again rotated in the horizontal plane about the vertical fulcrum provided by the tire machine's center post, causing fitting 14 to progress about the wheel rim, with roller 40 progressively depressing the side wall of the tire casing so as to bring more and more of the bead beneath the wheel rim.

The rolling action not only greatly reduces the friction of the fitting upon the tire side wall, but the angulation of the axis of roller 40 simultaneously applies to the tire side wall (and not to the bead directly) a component of force tending to urge the bead away from the rim edge in the horizontal plane, as well as in the vertically downward direction that is necessary to place the bead below the level of the wheel rim. The components of this force are indicated by the vector diagram at 44. There are simultaneously applied two forces: one urging the bead radially away from the center of the wheel, and one urging it axially (downwardly) towards the central plane of the rim well of the wheel. During the entire action, the roller 40 is kept in the correct position by reason of the bearing of wheel 34 against the inside of the flange or shoulder 42. It is important that the angulation of plate 28 be such that the axis of the handle 10 shall pass near the point of contact of roller 40 with the tire casing.

Mushroom roller 40 is preferably a portion of a sphere having a radius of slightly over one inch (e.g., 1 and 1/16 inch), the segment having a maximum thickness (in the axial direction) of about 3/4 inch. Its outer rim or edge is rounded as at 46 to obviate any possibility of the tire's being cut or damaged; however, it will be understood that, when properly used, only the spherical surface of roller 40 actually touches the tire wall.

A notable distinguishing feature of the arrangement as described is the fact that in installing a tire in position, no part of the tool portion 14 is in contact with the tire bead, or lies within the tire casing so that the inner tube might be damaged, if one is present. Moreover, no part of the tool can cut or abrade the wheel rim, and the latter cannot therefore be accidentally damaged in such a way as to injure the tire bead during any subsequently removals or installations of casings to that wheel. Only rolling contact is required with any part of the tire structure.

While the invention has been described and illustrated herein in connection with the best embodiment thereof that is presently known, it is obviously subject to minor changes and extensions as will occur to those familiar with such devices, without departing from the true scope of the invention as defined in the appended claims.

What is claimed is:

1. A tire tool comprising an elongated straight bar handle, and a tire-applying fitting rigidly secured to an end of said handle; said fitting being constituted by a support plate angled slightly away from the axis of the handle and a pair of rollers mounted on said plate by shafts extending outwardly from the same side of said plate towards the prolongation of the handle axis; the axes of said shafts being coplanar with the handle axis, and said rollers being positioned so that as one rolls along the inner surface of a wheel flange, the other is positioned to engage and depress the side wall of a tire mounted on said wheel.

2. A tire tool in accordance with claim 1, in which the shaft of one roller extends substantially perpendicular to said plate near its connection with the handle, and in which the shaft of the other roller extends from said plate at its distal end, and is inclined acutely to the direction of the first shaft.

3. A tire tool in accordance with claim 1, in which the outermost roller has the shape of a segment of a sphere, and is adapted to engage the side wall of a tire and exert thereon forces directed both radially away from the center of a wheel upon which a tire is being mounted by said tool, and axially towards the central plane of the rim well of such wheel.

References Cited in the file of this patent

UNITED STATES PATENTS

| | | |
|---|---|---|
| 834,908 | Hussey | Nov. 6, 1906 |
| 963,353 | Broadwell | Apr. 13, 1907 |
| 1,938,940 | Smith | Dec. 12, 1933 |
| 2,569,789 | Weaver | Oct. 2, 1951 |
| 2,888,064 | Coxworth | May 26, 1959 |

FOREIGN PATENTS

| | | |
|---|---|---|
| 1,215,657 | France | Apr. 20, 1960 |
| 513,592 | Canada | June 7, 1955 |